United States Patent [19]

Wilkinson

[11] 4,185,461
[45] Jan. 29, 1980

[54] TURBOJET ENGINE WITH COMBUSTOR BYPASS

[75] Inventor: David B. Wilkinson, Xenia, Ohio

[73] Assignee: The United States of America as represented by the Secretary of the Air Force, Washington, D.C.

[21] Appl. No.: 868,359

[22] Filed: Jan. 10, 1978

[51] Int. Cl.² .......................... F02K 3/10; F02K 1/02
[52] U.S. Cl. ...................................... 60/261; 60/262; 60/39.23
[58] Field of Search .............. 60/261, 262, 247, 284, 60/39.67, 39.21, 39.23, 39.37

[56] References Cited

U.S. PATENT DOCUMENTS

| | | | |
|---|---|---|---|
| 2,693,674 | 11/1954 | Anxionnaz et al. | 60/262 |
| 2,946,185 | 7/1960 | Bayer | 60/262 |
| 3,045,425 | 7/1962 | Seifferlein | 60/261 |
| 3,486,338 | 12/1969 | Haussmann et al. | 60/262 |

FOREIGN PATENT DOCUMENTS 925984  3/1955  Fed. Rep. of Germany ............. 60/262
615277  1/1961  Italy ........................................... 60/262

OTHER PUBLICATIONS

Hill et al., *Mechanics and Thermodynamics of Propulsion*, 1965, pp. 216–217.

*Primary Examiner*—Carlton R. Croyle
*Assistant Examiner*—Thomas I. Ross
*Attorney, Agent, or Firm*—Joseph E. Rusz; Richard J. Killoren

[57] ABSTRACT

A propulsion system having an afterburning turbojet with the fuel supplied at the inlet to the turbojet compressor. The turbojet combustor has a bypass with a flow control connected at the inlets to the combustor and the bypass to control the amount of fuel-air mixture from the compressor that enters the combustor.

2 Claims, 1 Drawing Figure

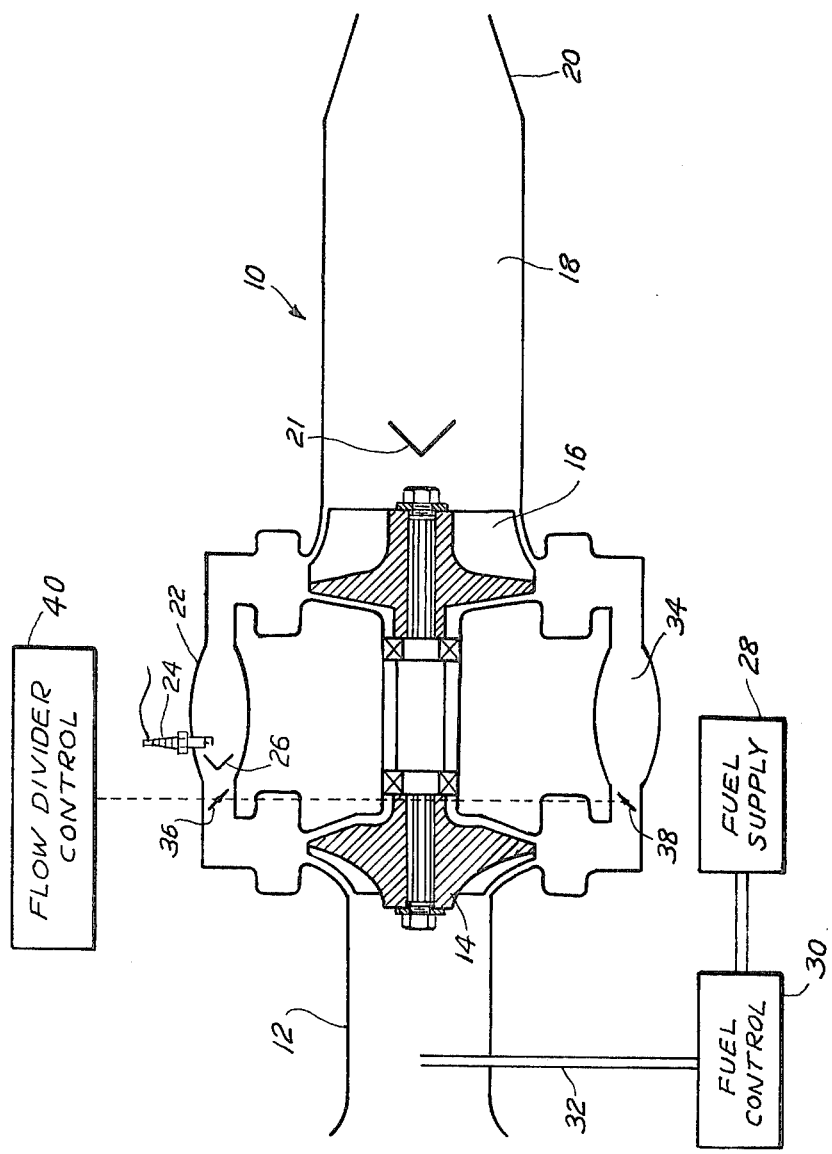

TURBOJET ENGINE WITH COMBUSTOR BYPASS

RIGHTS OF THE GOVERNMENT

The invention described herein may be manufactured and used by or for the Government of the United States for all governmental purposes without the payment of any royalty.

BACKGROUND OF THE INVENTION

This invention relates to a low cost afterburning turbojet for use in small expendable missiles. In these systems wherein the propulsion system will function only one time and will not be recovered, it is sometimes desirable to provide high engine thrust per unit weight and volume, at the expense of fuel economy and range of throttleability.

BRIEF SUMMARY OF THE INVENTION

According to this invention, use is made of an afterburning turbojet wherein the afterburner is operated continuously. The fuel is injected into the input of the compressor to enhance the mixing of the fuel and air prior to entry into the combustor and provide increased engine air flow and thrust by reducing the compressor inlet air temperature. A bypass channel is provided around the combustor between the compressor and the turbine. A variable flow control is provided between the compressor and the combustor to divert portions of the fuel-air mixture through the bypass duct. The bypass fuel-air mixture and combustor products pass through the turbine into the afterburner. Though not shown an afterburner igniter may be required under some operating conditions.

IN THE DRAWING

The single FIGURE is a schematic diagram showing an afterburning turbojet according to the invention.

DETAILED DESCRIPTION OF THE INVENTION

Reference is now made to the drawing which shows an afterburning turbojet 10 having an inlet duct 12, a compressor 14, a turbine 16 and an afterburner 18 with an exit nozzle 20. A flameholder 21 may be provided in the afterburner, if needed. A combustor 22 is connected between the compressor 14 and the turbine 16. The combustor has a conventional igniter 24 and flame holder 26. Fuel is supplied from fuel supply 28 through fuel control 30 and fuel injector 32 to the inlet duct 12. The fuel is mixed with air in the inlet and the compressor to provide a combustible mixture which is supplied to the combustor 22. A bypass duct 34 is also provided in the inlets to the combustor 22 and the bypass duct 34. The valves 36 and 38 are controlled by a flow divider control 40 which in its simplist embodiment could be a control linkage for setting the valves 36 and 38 for the desired fixed bypass ratio. The flow control could however include various control systems such as a programmed control to adjust the bypass ratio for different flight conditions. The combustion products and bypass fuel-air mixture pass through the turbine wherein the bypass mixture provides some cooling for the turbine. The hot combustion products raise the temperature of the fuel-air mixture to combustion temperatures in the afterburner wherein the fuel burns to add to the engine thrust. Normally the flow time through the turbine is not sufficient to permit burning within the turbine though under some conditions there may be some burning within the turbine. However, the major portion of the burning will take place in the afterburner and the bypass ratio could be adjusted to keep the turbine temperature within safe limits. Any burning within the turbine will not raise the turbine temperature to the level which would result if all of the fuel-air mixture were burned in the combustor.

The positioning of the combustor and bypass on opposite sides of the engine is only for illustration purposes. The combustor and bypass could be positioned adjacent each other with a vane type flow divider positioned to divide the flow between the two flow paths. Also other types of flow dividers, such as fluidic flow control devices, could be used.

For some applications only one valve may be needed. For example the inlets to the two flow paths could be sized for one condition of flow with a valve being used in one path to vary from that set condition of flow.

In the operation of the device of the invention, fuel supplied to the air flow in inlet 12 is mixed with air in the inlet 12 and in the compressor 14. The fuel-air mixture from the compressor is divided between the combustor 22 and the bypass duct 34 as determined by the setting of valves 36 and 38. The fuel-air mixture within combustor 22 is ignited by igniter 24 in a conventional manner with the flame being maintained by the flame holder 26 in a normal manner. The output of the combustor 22 and the flow through bypass 34 enter the turbine to supply power to the compressor. The combustion products mix with the bypass fuel-air mixture and raise the temperature of the fuel-air mixture to combustion temperatures within the afterburner. The burning of the bypass fuel-air mixture in the afterburner add to the engine thrust.

There is thus provided a flow cost propulsion system for use in small expendable missiles.

I claim:

1. A propulsion system, comprising: a turbojet engine including a compressor; a turbine mechanically coupled to said compressor; a combustion chamber interconnecting the output of the compressor and the input of said turbine; an afterburner connected to the output of said turbine; an exit nozzle connected to the output of said afterburner; means for supplying fuel to the input of said compressor; means for igniting the fuel-air mixture within said combustor; a flameholder within said combustor; a combustor bypass duct connected between the compressor outlet and the input of the turbine; means for controlling the portions of the compressor output flow passing through the combustion chamber and the combustor bypass duct.

2. The device as recited in claim 1 wherein said means for controlling the portions of compressor output flow passing through the combustion chamber and the bypass duct includes flow control valves in the inputs of the combustor and the bypass duct.

* * * * *